United States Patent
Giannoni et al.

(10) Patent No.: US 6,685,200 B1
(45) Date of Patent: Feb. 3, 2004

(54) FLAT TOP CARRIER DECK

(76) Inventors: Sergio Giannoni, 2848 N. State Rd., Hollywood, FL (US) 33021; Daniel C. Giannoni, 2848 N. State Rd., Hollywood, FL (US) 33021

( * ) Notice: Subject to any disclaimer, the term of this patent is extended or adjusted under 35 U.S.C. 154(b) by 0 days.

(21) Appl. No.: 10/217,099

(22) Filed: Aug. 12, 2002

(51) Int. Cl.[7] .............................. B62B 3/02; B65D 19/06
(52) U.S. Cl. .............................. 280/47.35; 280/47.28; 280/47.18; 280/33.992; 108/57.16
(58) Field of Search .................... 280/47.131, 47.17, 280/47.18, 47.27, 47.28, 47.34, 47.35, 79.11, 33.992, 47.29; 224/42.34, 42.33, 409, 411; 108/57.16, 57.29, 901

(56) References Cited

U.S. PATENT DOCUMENTS

| | | | | |
|---|---|---|---|---|
| 1,558,322 A | * | 10/1925 | Whitehead | 224/42.34 |
| 3,785,669 A | * | 1/1974 | Doheny | 280/47.18 |
| 4,277,075 A | * | 7/1981 | Shay | 280/47.36 |
| 5,415,109 A | * | 5/1995 | McBride | 108/57.29 |
| 5,465,987 A | * | 11/1995 | DellaVecchia | 280/47.28 |
| 5,498,100 A | * | 3/1996 | Guernsey | 404/6 |
| 5,960,720 A | * | 10/1999 | Borland et al. | 108/53.1 |
| 6,227,523 B1 | * | 5/2001 | Haberlen | 256/59 |
| 6,247,710 B1 | * | 6/2001 | Luberda | 280/47.28 |
| 6,302,414 B1 | * | 10/2001 | Berthiaume et al. | 280/47.18 |
| 6,308,967 B1 | * | 10/2001 | Stallbaumer et al. | 280/47.18 |
| 6,394,470 B1 | * | 5/2002 | Shirai | 280/33.996 |
| 6,588,775 B2 | * | 7/2003 | Malone, Jr. | 280/47.18 |

* cited by examiner

*Primary Examiner*—Brian L. Johnson
*Assistant Examiner*—Jeffrey J. Restifo
(74) *Attorney, Agent, or Firm*—Donald J. Ersler

(57) ABSTRACT

A flat top carrier deck includes a base plate, and at least one elevating gate. The base plate is preferably fabricated from a perforated sheet of material. Each elevating gate engages the base plate. Each elevating gate is either disposed in a retracted position or an extended position. Preferably, a handle clearance impression is formed in a first end of the base plate and a lift clearance impression is formed in a second end thereof. The clearance impressions provide an outline for snapping out a clearance slot. However, handle and lift clearance slots may also be formed in the base plate during manufacture. The clearance slots allow the flat top carrier deck to be retained by a horizontal hand truck.

8 Claims, 9 Drawing Sheets

FLAT TOP CARRIER DECK

BACKGROUND OF THE INVENTION

1. Field of the Invention

The present invention relates generally to hand trucks and more specifically to a flat top carrier deck for transporting various articles which is sized to be received by a horizontal hand truck.

2. Discussion of the Prior Art

It appears that carrier decks are not commercial available for retention by a horizontal hand truck.

Accordingly, there is a clearly felt need in the art for a flat top carrier deck which is sized to be received by different sizes of horizontal hand trucks; is capable carrying different loads; and which does not have to be secured to a bottom of the horizontal hand truck.

SUMMARY OF THE INVENTION

The present invention provides a flat top carrier deck which is sized to be received by a horizontal hand truck. The flat top carrier deck includes a base plate, and at least one elevating gate. The base plate is preferably fabricated from a perforated sheet. Each elevating gate is engaged with the base plate. Each elevating gate is either disposed in a retracted or an extended position. Preferably, handle clearance scoring is formed in a first end of the base plate. The handle clearance scoring provides an outline for snapping out a handle clearance slot which receives a handle of the horizontal hand truck. Preferably, lift clearance scoring is formed on a second end of the base plate. The lift clearance scoring provides an outline for snapping out a lift clearance slot, which receives a lift of the horizontal hand truck. The flat top carrier deck is retained on the horizontal hand truck with the handle and lift clearance slots. However, handle and lift clearance slots may be formed in the base plate during manufacture. The handle and lift clearance scoring allow the flat top carrier deck to be used with horizontal hand trucks having different width handles and lifts.

Accordingly, it is an object of the present invention to provide a flat top carrier deck which is sized to be received by different sizes of horizontal hand trucks.

It is a further object of the present invention to provide a flat top carrier deck which is capable of carrying different loads.

Finally, it is another object of the present invention to provide a flat top carrier deck which does not have to be secured to a bottom of the horizontal hand truck with fasteners or the like.

These and additional objects, advantages, features and benefits of the present invention will become apparent from the following specification.

DETAILED DESCRIPTION OF THE PREFERRED EMBODIMENTS

Figure 1:
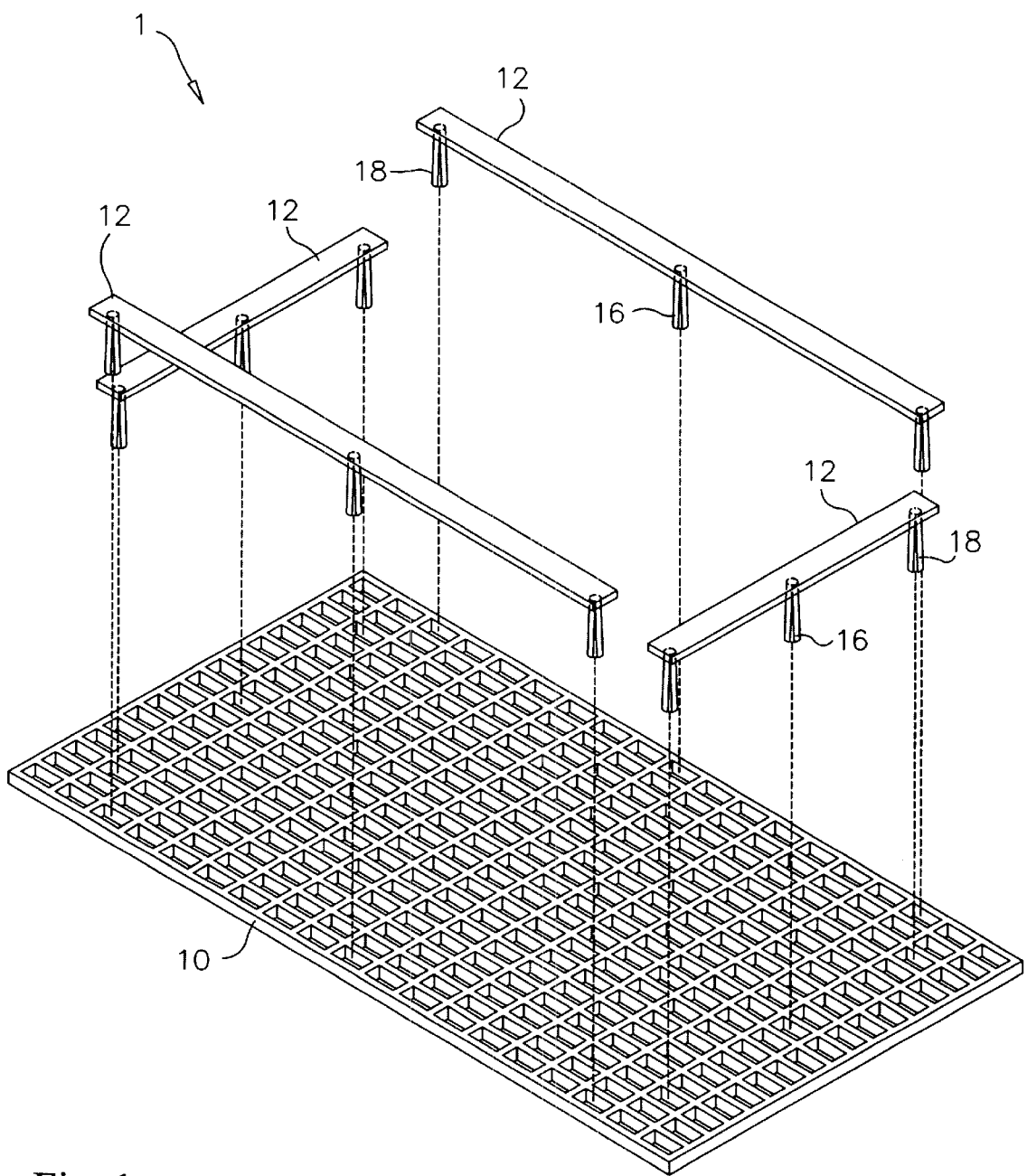
FIG. 1 is an exploded perspective view of a flat top carrier deck in accordance with the present invention.
Figure 2:
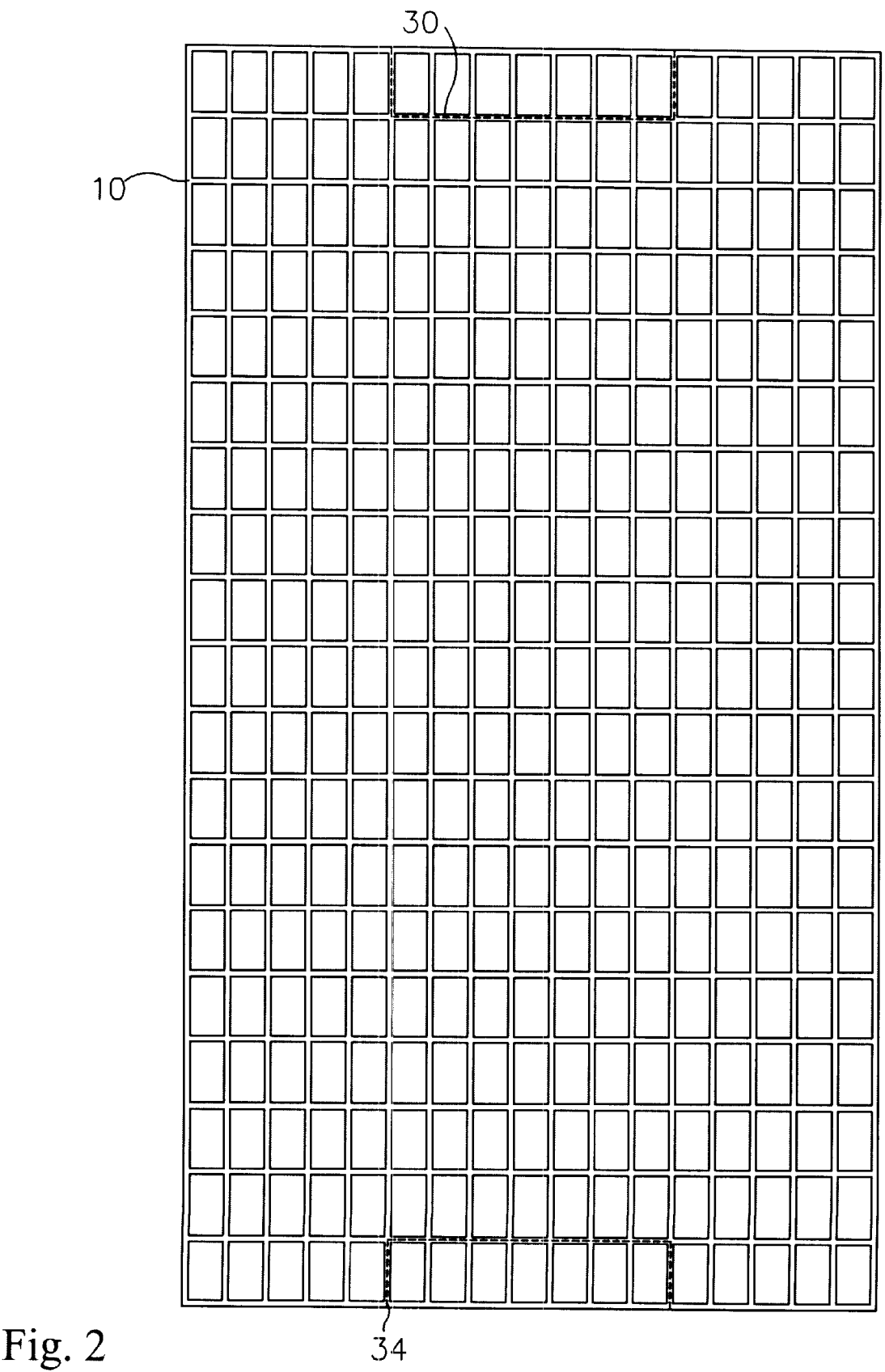
FIG. 2 is a top view of a base plate with handle and lift clearance scoring of a flat top carrier deck in accordance with the present invention.
Figure 3:
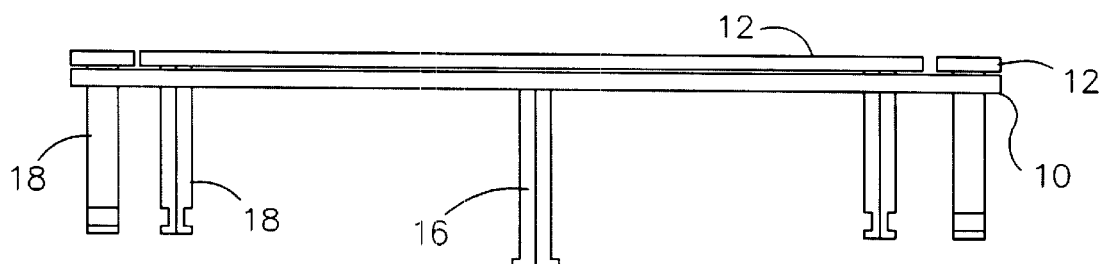
FIG. 3 is an end view of a flat top carrier deck with elevating gates in a retracted position in accordance with the present invention.
Figure 4:
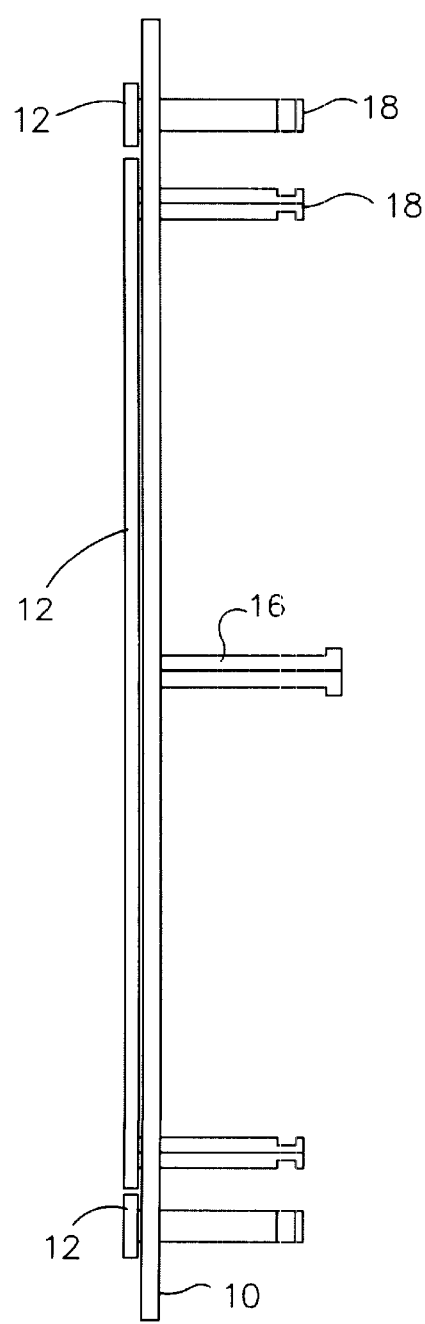
FIG. 4 is a side view of a flat top carrier deck with elevating gates in a retracted position in accordance with the present invention.
Figure 5:
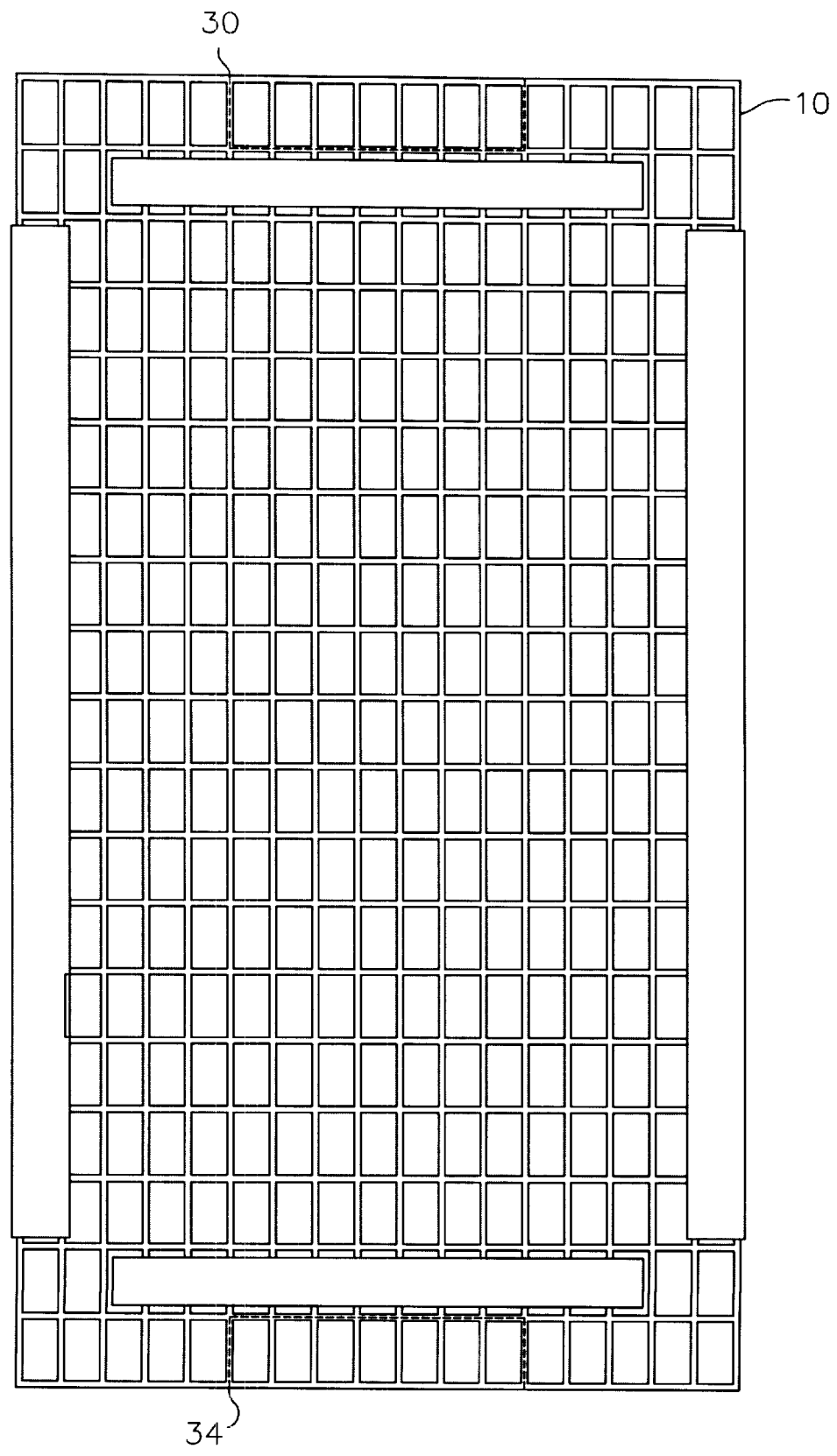
FIG. 5 is a top view of a flat top carrier deck in accordance with the present invention.
Figure 6:
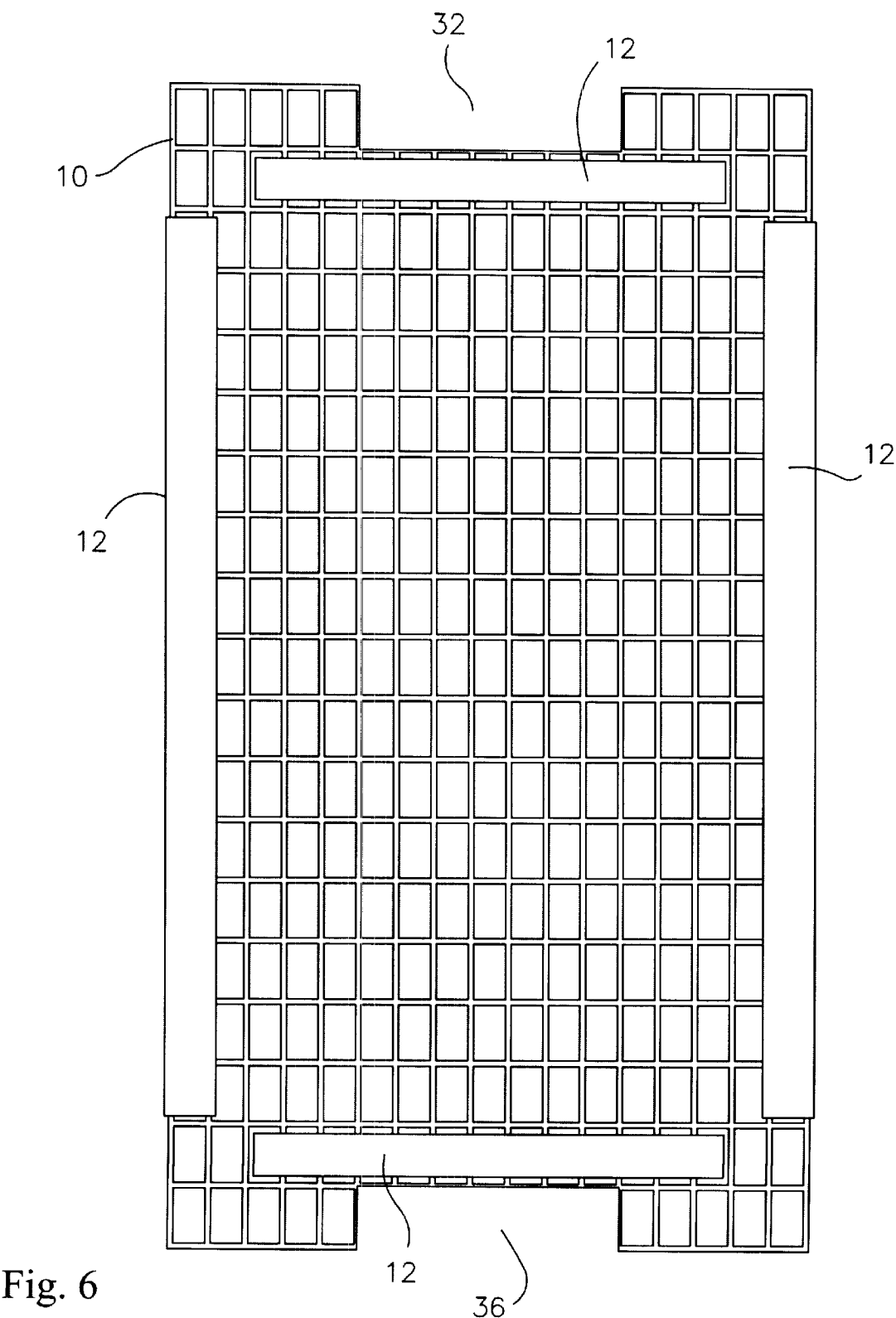
FIG. 6 is a top view of a flat top carrier deck having handle and lift clearance slots in accordance with the present invention.
Figure 9:
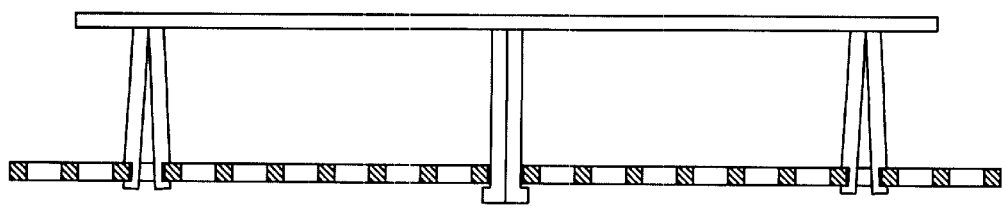
FIG. 9 is an enlarged cross sectional view of an elevating gate in an extended position of a flat top carrier deck in accordance with the present invention.

With reference now to the drawings, and particularly to FIG. 1, there is shown an exploded perspective view of a flat top carrier deck 1. The flat top carrier deck 1 includes a base plate 10, and at least one elevating gate 12. The base plate 10 is preferably fabricated from a perforated sheet. The perforated sheet is preferably fabricated from plastic, aluminum, steel or any other suitable material. With reference to FIG. 9, each elevating gate 12 engages the base plate 10. Each elevating gate 12 is either disposed in a retracted position or an extended position.

Figure 7:
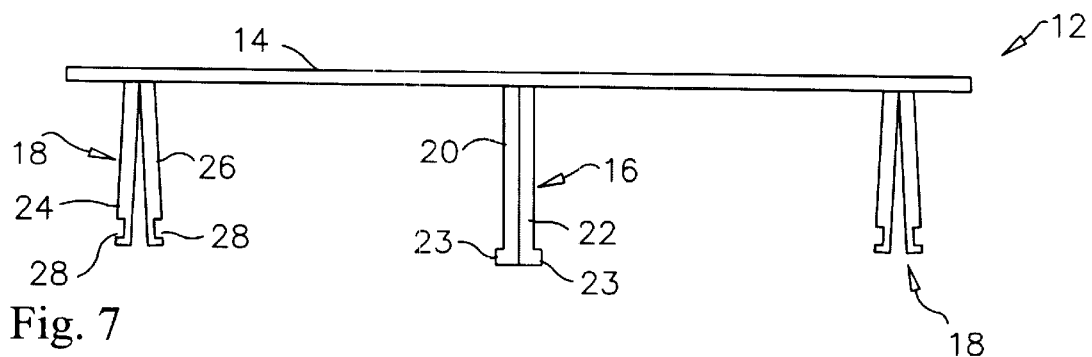
FIG. 7 is an enlarged side view of an elevating gate of a flat top carrier deck in accordance with the present invention.
Figure 7A:
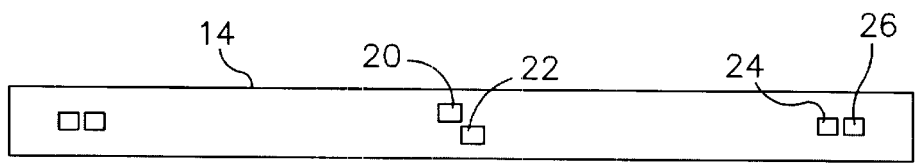
FIG. 7a is an enlarged bottom view of an elevating gate of a flat top carrier deck in accordance with the present invention.
Figure 8:
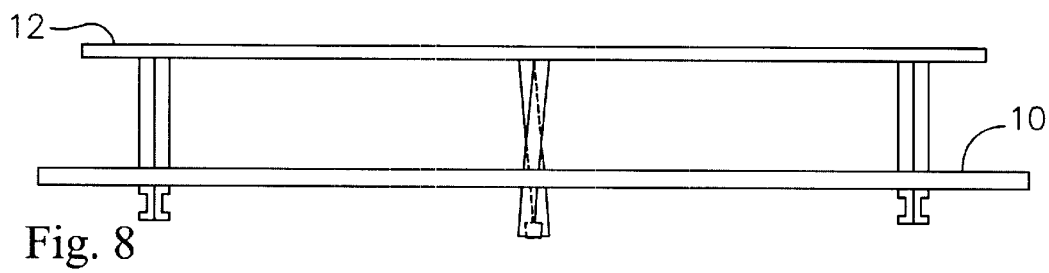
FIG. 8 is an enlarged side view of an elevating gate with the pull out legs flexed inward for insertion into a base plate of a flat top carrier deck in accordance with the present invention.

With reference to FIGS. 7–8, each elevating gate 12 includes a base frame 14, at least one pair of pull-out legs 16, and at least two pairs of retainer legs 18. The at least one pair of pull-out legs 16 and at least two pairs of retainer legs 18 extend from a bottom of the base frame 14. Each pair of pull-out legs 16 includes a first pull-out leg 20 and a second pull-out leg 22. A pull-out projection 23 is formed on a bottom of each pull-out leg. The pull-out projection 23 prevents each elevating gate 12 from being removed from the base plate 10 without squeezing the first and second pull-out legs together. The first and second pull-out legs are staggered apart to allow the first and second pull-out legs to be squeezed together for insertion into the base plate 10 as shown in FIG. 8.

Each pair of retention legs 18 includes a first retention leg 24 and a second retention leg 26. A retention slot 28 is formed at a bottom of each retention leg. The retention slot 28 is sized to receive a thickness of the base plate 10. Each retention slot 28 prevents the elevating gate 12 from being removed or pushed down without squeezing the first and second retention legs together. The first and second retention legs are squeezed together for insertion into the base plate 10 as shown in FIG. 8.

Figure 10:
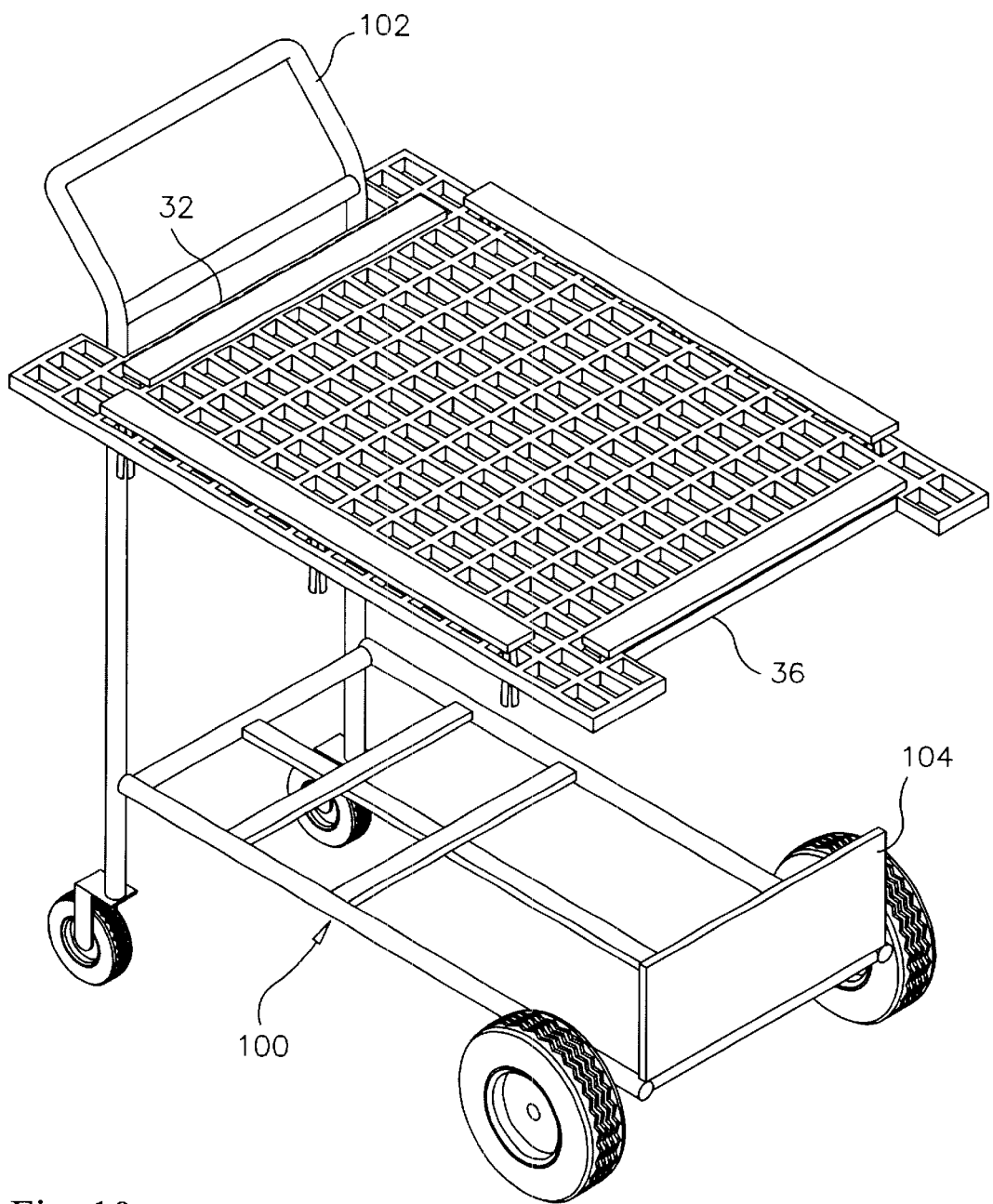
FIG. 10 is a perspective view of a flat top carrier deck disposed above a horizontal hand truck in accordance with the present invention.
Figure 11:
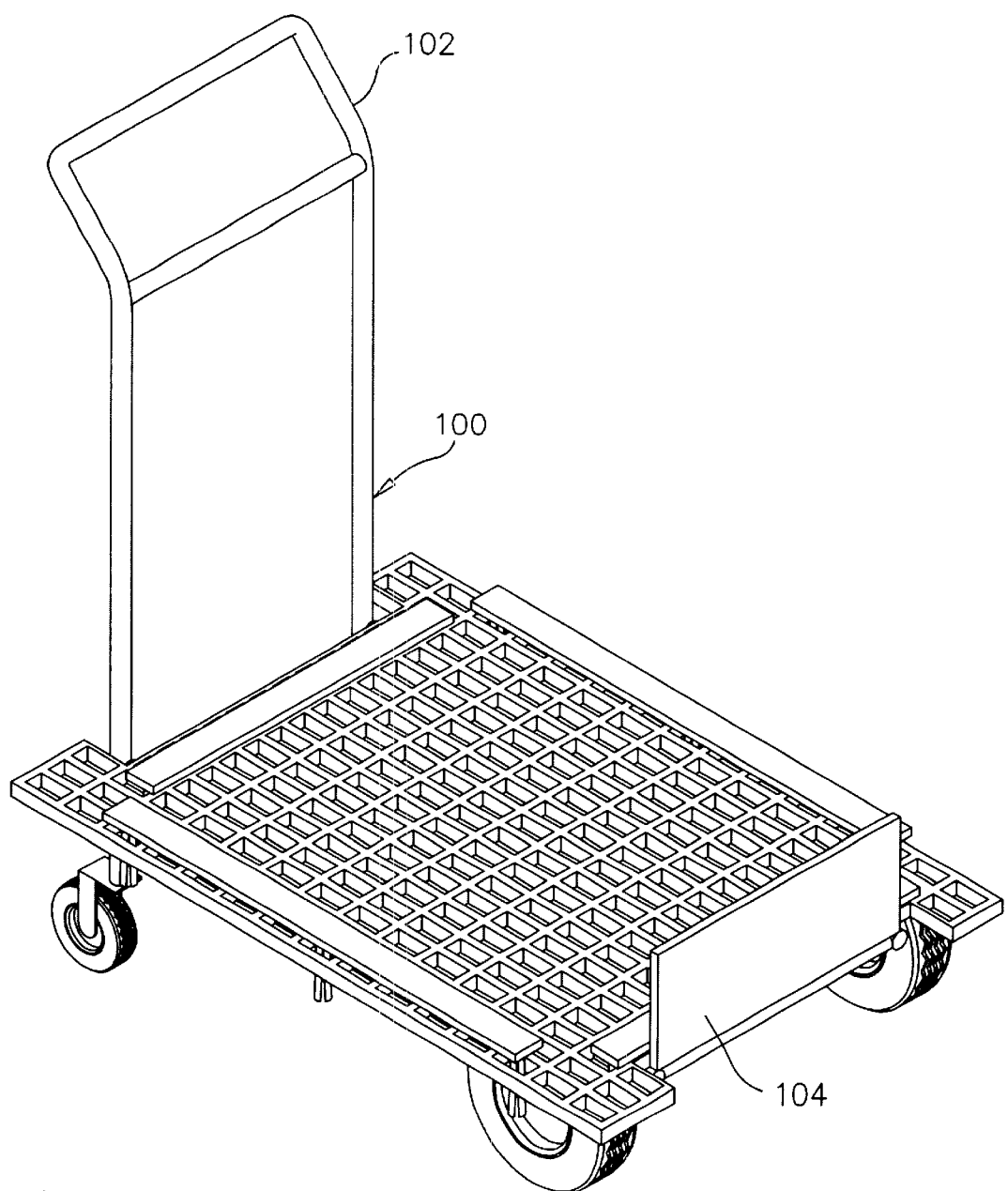
FIG. 11 is a perspective view of a flat top carrier deck retained by a horizontal hand truck in accordance with the present invention.
Figure 12:
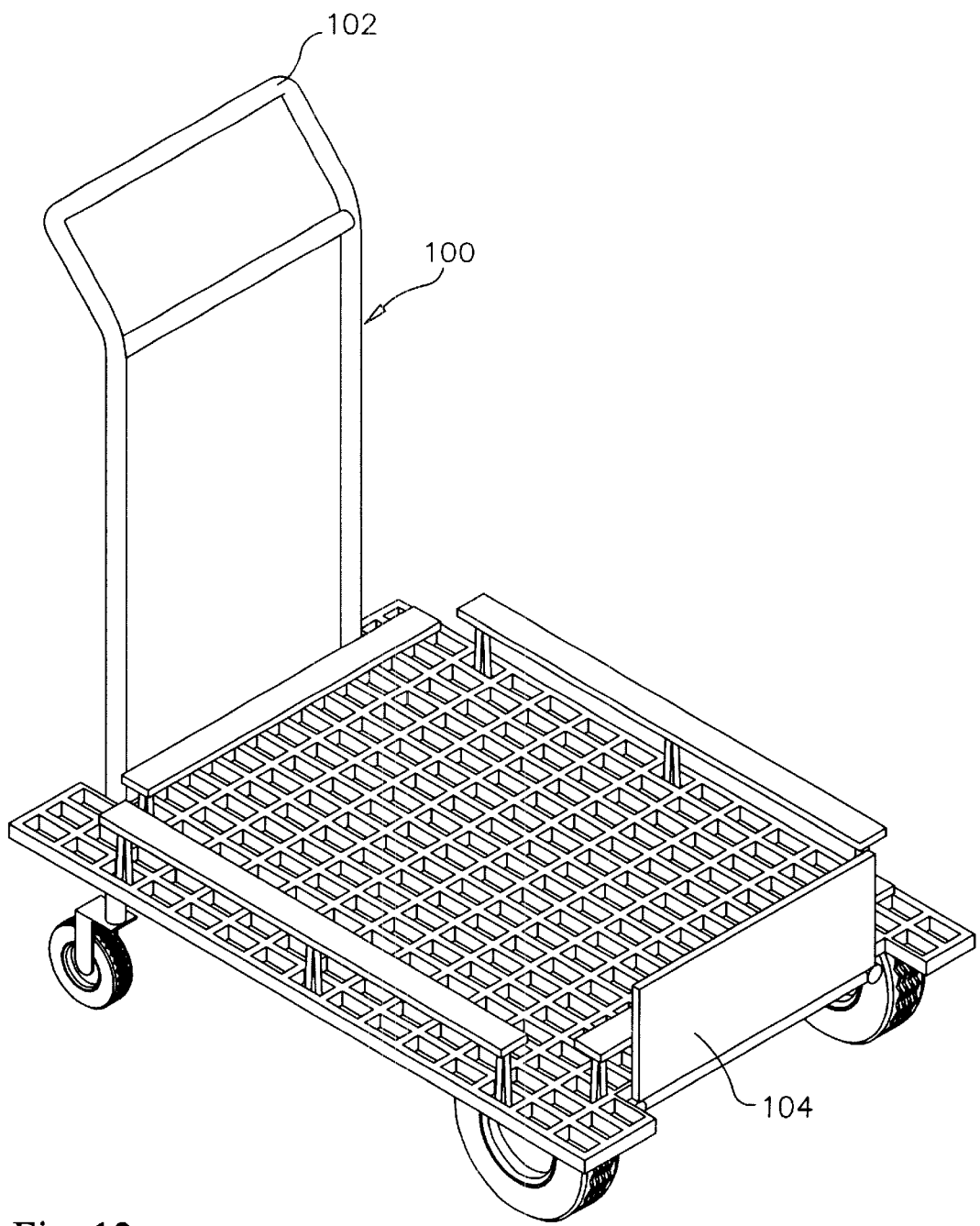
FIG. 12 is a perspective view of a flat top carrier deck retained by a horizontal hand truck with elevating gates in an extended position in accordance with the present invention.

With reference to FIGS. 2–6, handle clearance scoring 30 is formed in a first end of the base plate 10. With reference to FIGS. 10–12, the handle clearance scoring 30 provides an outline for snapping out a handle clearance slot 32 for a handle 102 of a horizontal hand truck 100. Preferably, lift clearance scoring 34 is formed on a second end of the base plate 10. The lift clearance scoring 34 provides an outline for snapping out a lift clearance slot 36 for a lift 104 of the horizontal hand truck 100. The handle clearance slot 32 receives the handle 102 of the horizontal hand truck 100 and the lift clearance slot receives the lift 104 of the horizontal hand truck 100. The flat top carrier deck 1 is retained on the horizontal hand truck 100 with the handle and lift clearance slots. The handle and lift clearance scoring may be formed in the base plate 10 by pressure forming, heating, or with any other suitable process. However, the handle and lift clearance slots may be formed in the base plate during manufacture. The handle and lift clearance scoring allows the flat top carrier deck 1 to be used with horizontal hand trucks having different width handles and lifts.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A flat top carrier deck comprising:

a base plate having a plurality of perforations;

at least one elevating gate including a base frame, at least one pair of pull-out legs, and at least two pairs of retention legs extending from said base frame, said at least one elevating gate being engaged with said base plate, said at least one elevating gate having a retracted and an extended position; and each one of said at least one pair of pull-out legs including a first pull-out leg and a second pull-out leg, a first pull-out projection being formed on a bottom of said first pull-out leg and a second pull-out projection being formed on a bottom of said second pull-out leg.

2. The flat top carrier deck of claim 1 wherein:

each one of said at least two pairs of retention legs including a first retention leg and a second retention leg, a first retention slot being formed at a bottom of said first retention leg and a second retention slot being formed at a bottom of said second retention leg, said first and second retention slots engaging a thickness of said base plate.

3. The flat top carrier deck of claim 1 wherein:

a handle clearance scoring being formed on one end of said base plate and a lift clearance scoring being formed on the other end of said base plate.

4. The flat top carrier deck of claim 1 wherein:

a handle clearance slot being formed on one end of said base plate and a lift clearance slot being formed on the other end of said base plate.

5. A flat top carrier deck in combination with a horizontal hand truck, comprising:

a base plate having a plurality of perforations; and at least one elevating gate being engagable with said base plate such that each one of said at least one elevating gate having a retracted and an extended position, said at least one elevating gate including a base frame, at least one pair of pull-out legs, and at least two pairs of retention legs extending from said base frame;

each one of said at least one pair of pull-out legs having a first pull-out leg and a second pull-out leg, a first pull-out projection being formed on a bottom of said first pull-out leg and a second pull-out projection being formed on a bottom of said second pull-out leg;

said horizontal hand truck including a handle and a lift; and a handle clearance slot being formed in one end of said base plate to receive said handle and a lift clearance slot being formed in the other end of said base plate to receive said lift.

6. The flat top carrier deck in combination with a horizontal hand truck of claim 5 wherein:

each one of said at least two pairs of retention legs including a first retention leg and a second retention leg, a first retention slot being formed at a bottom of said first retention leg and a second retention slot being formed at a bottom of said second retention leg, said first and second retention slots engaging a thickness of said base plate.

7. A method of modifying a horizontal hand truck for carrying various articles, comprising the steps of:

providing the horizontal hand truck with a handle and a lift;

providing a base plate having a handle clearance formed on one end and a lift clearance formed on the other end thereof;

providing at least one elevating gate engaged with said base plate, each one of said at least one elevating gate having a retracted position and an extended position for retaining the various articles on the base plate, providing said at least one elevating gate with a base frame, at least one pair of pull-out legs, and at least two pairs of retention legs extending from said base frame; and providing each one of said at least one pair of pull-out legs with a first pull-out leg and a second pull-out leg, a first pull-out projection being formed on a bottom of said first pull-out leg and a second pull-out projection being formed on a bottom of said second pull-out leg.

8. A method of modifying a horizontal hand truck for carrying various articles of claim 7, further comprising the step of:

providing each one of said at least two pairs of retention legs with a first retention leg and a second retention leg, a first retention slot being formed at a bottom of said first retention leg and a second retention slot being formed at a bottom of said second retention leg, said first and second retention slots engaging a thickness of said base plate.

* * * * *